D. C. JACOBUS.
COMBINED SHOVEL AND ASH SIFTER.
APPLICATION FILED JAN. 29, 1920.
1,357,709.
Patented Nov. 2, 1920.
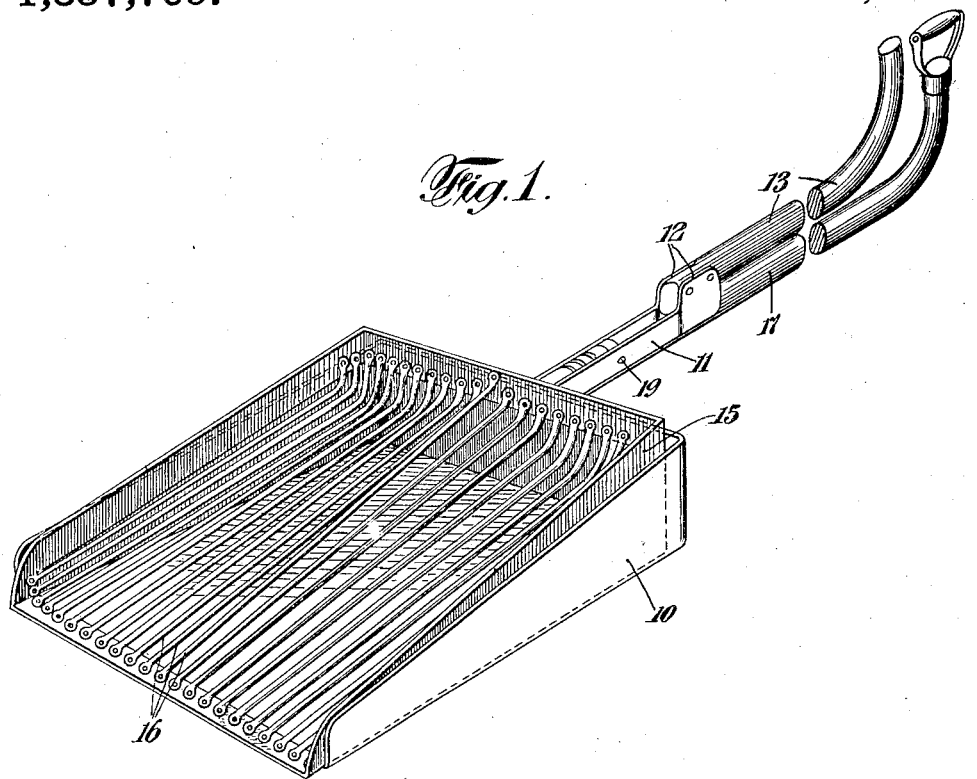
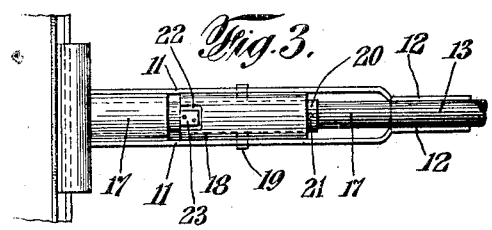
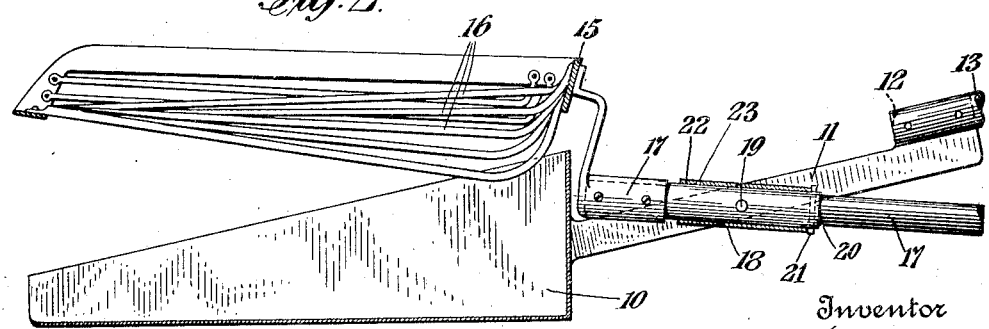
Inventor
Daniel C. Jacobus
By his Attorney

UNITED STATES PATENT OFFICE.

DANIEL C. JACOBUS, OF CALDWELL, NEW JERSEY.

COMBINED SHOVEL AND ASH-SIFTER.

1,357,709.   Specification of Letters Patent.   Patented Nov. 2, 1920.

Application filed January 29, 1920. Serial No. 354,993.

*To all whom it may concern:*

Be it known that I, DANIEL C. JACOBUS, a citizen of the United States, and a resident of Caldwell, in the county of Essex and State of New Jersey, have invented certain new and useful Improvements in the Combined Shovels and Ash-Sifters, of which the following is a specification.

The invention relates to a combined shovel and ash-sifter; and it has for its object to provide a simple and effective means for separating the ash from unburned and partly burned coal and large cinders. A further object of the invention consists in a device of this character which may be operated within the furnace itself, for example below the grate thereof, thus obviating the scattering of dust which is carried off by the draft of the furnace.

The nature of the invention will be best understood when described in connection with the accompanying drawings, in which—

Figure 1 is a perspective view of the improved shovel, constructed and arranged in accordance with the present invention.

Fig. 2 is a longitudinal section therethrough and shows the sieve portion elevated and in operative position.

Fig. 3 is a fragmentary plan view.

Similar characters of reference designate corresponding parts throughout the several views.

Referring to the drawings, 10 designates an imperforate shovel which may be of the usual or special construction. The same is shown as provided with a handle portion 11 which is bifurcated and may be provided at its free end with upwardly extending lugs 12 to which is secured a handle extension 13 by means of which the shovel may be manipulated as an ordinary shovel.

Within the shovel proper 10 is arranged to fit a basket portion 15 or sieve member, of which the bottom at least and preferably a portion of the sides and back is perforated or, rather, composed of a plurality of parallel disposed wires or rods 16 extending longitudinally thereof to form a screen. The open-work bottom of the sieve member is constructed to be higher along its median line and tapers gradually to the sides, dividing the bottom into two oppositely sloping portions and thus preventing the accumulation of ashes etc. in the center of the shovel when the same is rocked as hereinafter set forth.

To this end, the sieve member is provided with a handle 17 arranged to be pivoted to move in a vertical plane, as well as to rock between the arms of the handle 11. This is effected, preferably, by providing a sleeve 18 about the handle 17 and pivotally mounting said sleeve to the arms of the handle 11 as through pins 19. This not only permits of the sieve member 15 being raised above shovel 10, but also of the former being oscillated or rocked about the axis of its handle, thereby affording a thorough shaking and separation of the ash from the coal or partly burned material and larger cinders. The sleeve 18 is preferably mounted about a second sleeve 20 secured to the handle 17 by a pin 21 which serves, also, to prevent any undue endwise movement of the handle 17. Moreover, a pin or block 22 is arranged to extend upwardly from the inner sleeve 20 and through a notch 23 of the sleeve 18, whereby the rocking movement of the handle laterally is suitably limited and by which a jarring of the material to be sifted may be effected.

The construction of the combined shovel and sifter is such that the two may be simultaneously employed, when in the position shown in Fig. 1, by inserting same in the ash pit. The separation may also be effected therein, if desired, thus preventing the scattering about of dust which will then be drawn up through the furnace, whereupon the more valuable portion is reserved for future use and the remainder discarded.

I claim:

1. An ash-sifting shovel, comprising a body portion having a bifurcated handle, and a sifter portion adapted to fit within said body portion and pivotedly mounted in said bifurcated handle to allow a vertical motion of the sifter portion as well as a rocking or oscillation thereof.

2. An ash-sifting shovel, comprising a body portion having a bifurcated handle, and a sifter portion adapted to fit within said body portion and pivotedly mounted in said bifurcated handle, the sifter having a handle extending through the bifurcated portion of the handle of the body portion, a sleeve about the sifter handle, said sleeve being pivoted to the arms of said first named handle.

3. An ash-sifting shovel, comprising a body portion having a bifurcated handle with upwardly extending lugs, a handle extension secured to said lugs, and a sifter portion having a handle passing through the bifurcated portion of said first named handle, pivoted thereto and extending beneath the first named handle extension.

4. An ash-sifting shovel, comprising a body portion having a bifurcated handle, and a sifter portion adapted to fit within said body portion and pivotedly mounted in said bifurcated handle, the sifter having a handle extending through the bifurcated portion of the handle of the body portion, a sleeve about the sifter handle, said sleeve being pivoted to the arms of said first named handle, and means to limit the oscillation of the sifter handle within said sleeve.

5. In an ash-sifter shovel: a sifter portion having an open-work bottom composed of a plurality of parallel members and tapering from the median line to the sides thereof, as and for the purpose set forth.

Signed at New York in the county of New York and State of New York this 26th day of Jan'y A. D. 1920.

DANIEL C. JACOBUS.